Figure 2:
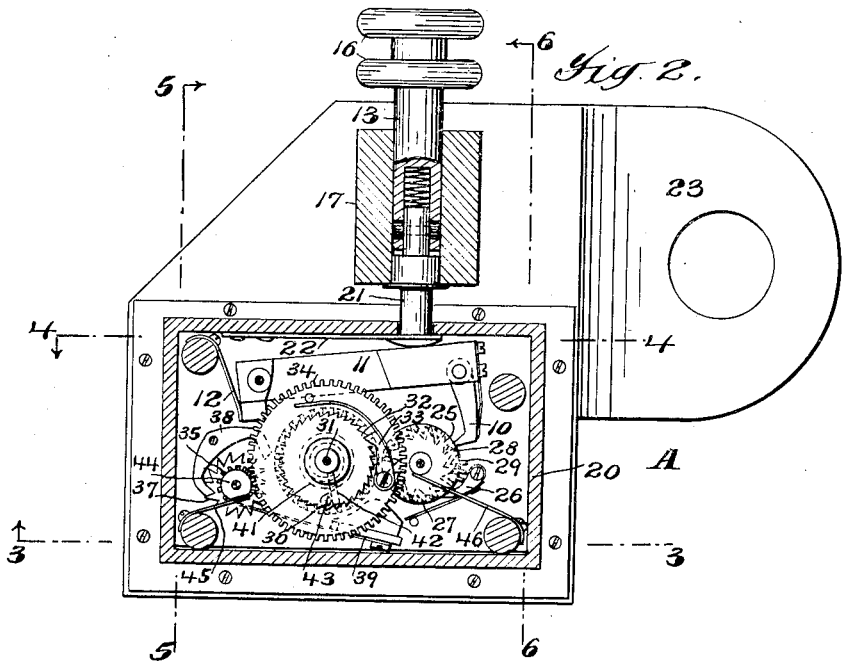

W. TRAFFORD.
SPEED INDICATOR.
APPLICATION FILED APR. 8, 1904.
961,559.
Patented June 14, 1910.
7 SHEETS—SHEET 1.
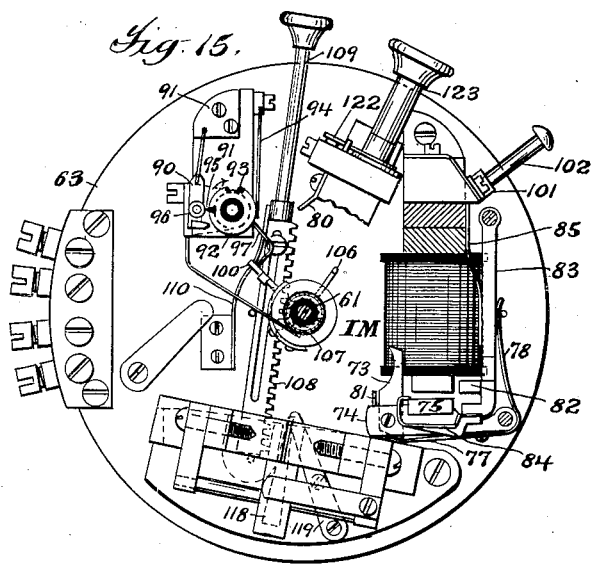
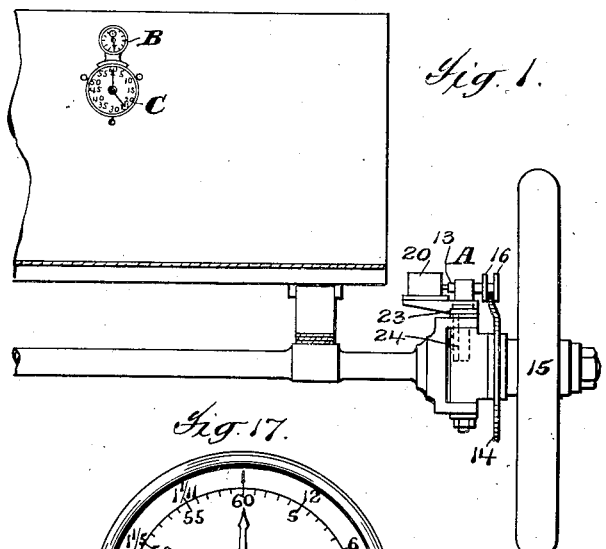
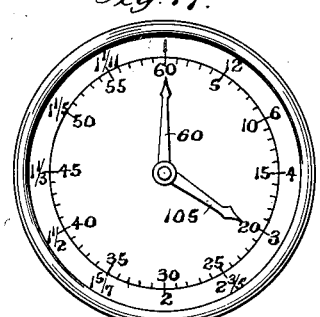

W. TRAFFORD.
SPEED INDICATOR.
APPLICATION FILED APR. 8, 1904.

961,559.

Patented June 14, 1910.
7 SHEETS—SHEET 2.

Attest:
W. H. Kennedy.
J. A. Travis.

Inventor:
Wesley Trafford
by his Attys
Philipp Sawyer Rice & Kennedy

W. TRAFFORD.
SPEED INDICATOR.
APPLICATION FILED APR. 8, 1904.
961,559.
Patented June 14, 1910.
7 SHEETS—SHEET 3.
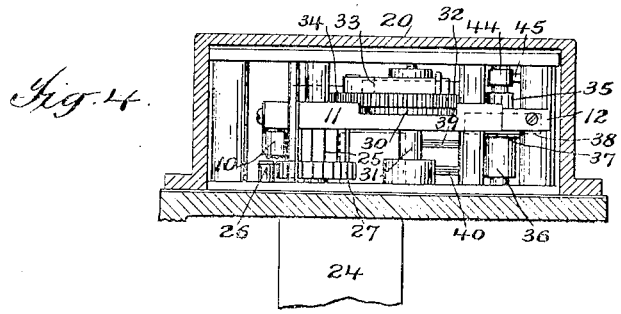
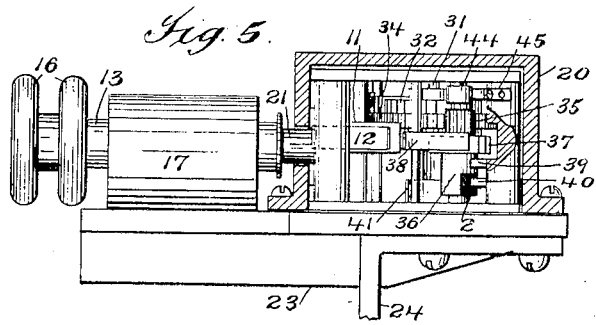
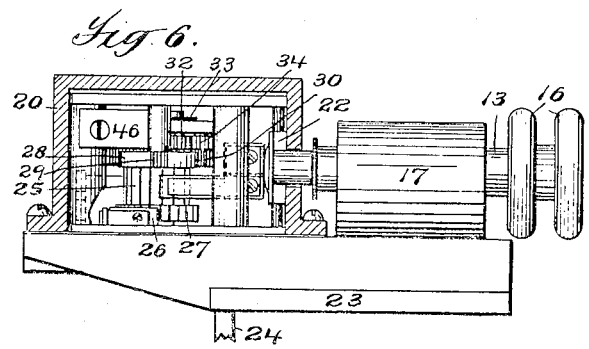

W. TRAFFORD.
SPEED INDICATOR.
APPLICATION FILED APR. 8, 1904.
961,559.
Patented June 14, 1910.
7 SHEETS—SHEET 4.
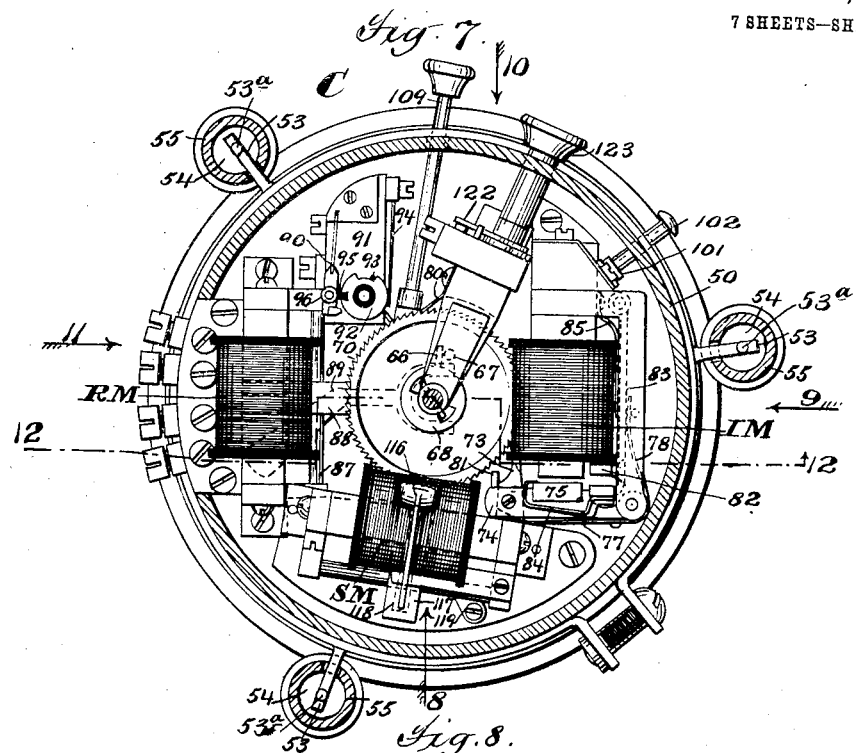
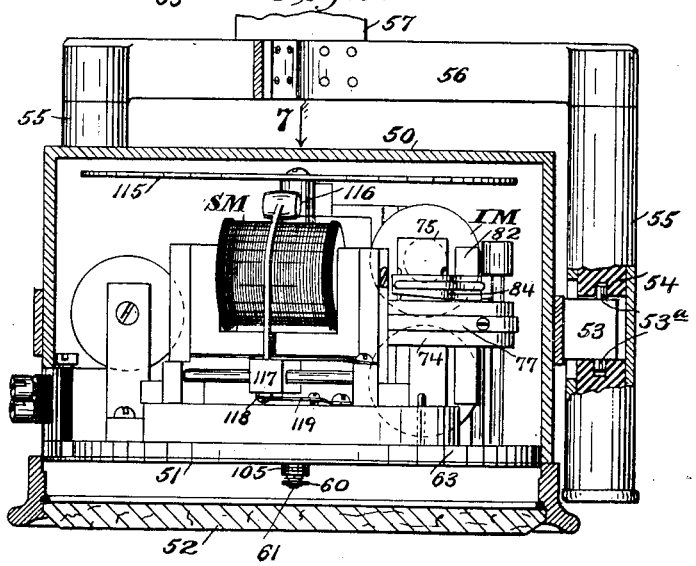
Attest:
W. J. H. Kennedy
J. A. Traver
Inventor:
Wesley Trafford
By his Attys
Philipp Sawyer Rice & Kennedy W. TRAFFORD.
SPEED INDICATOR.
APPLICATION FILED APR. 8, 1904.
961,559.
Patented June 14, 1910.
7 SHEETS—SHEET 5.
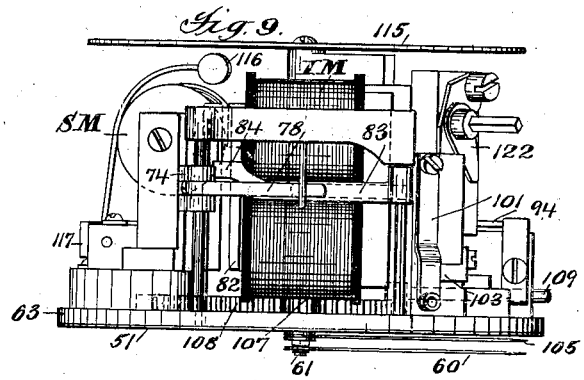
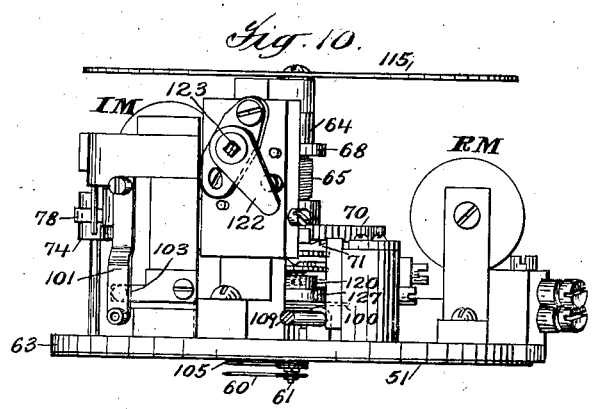
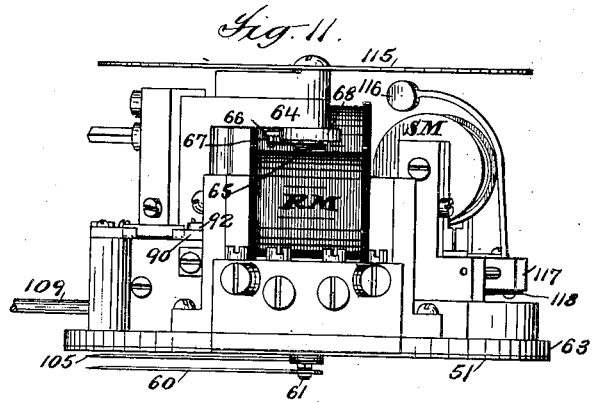

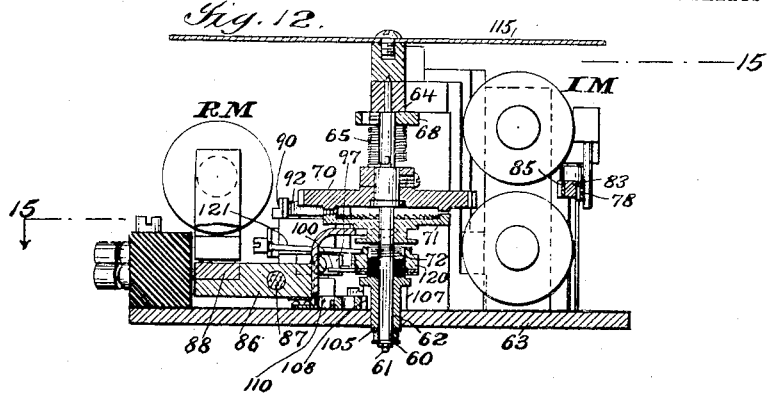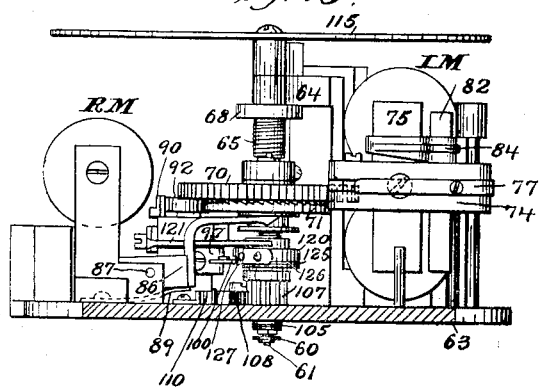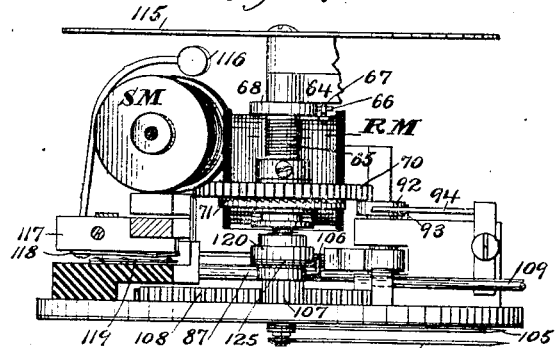

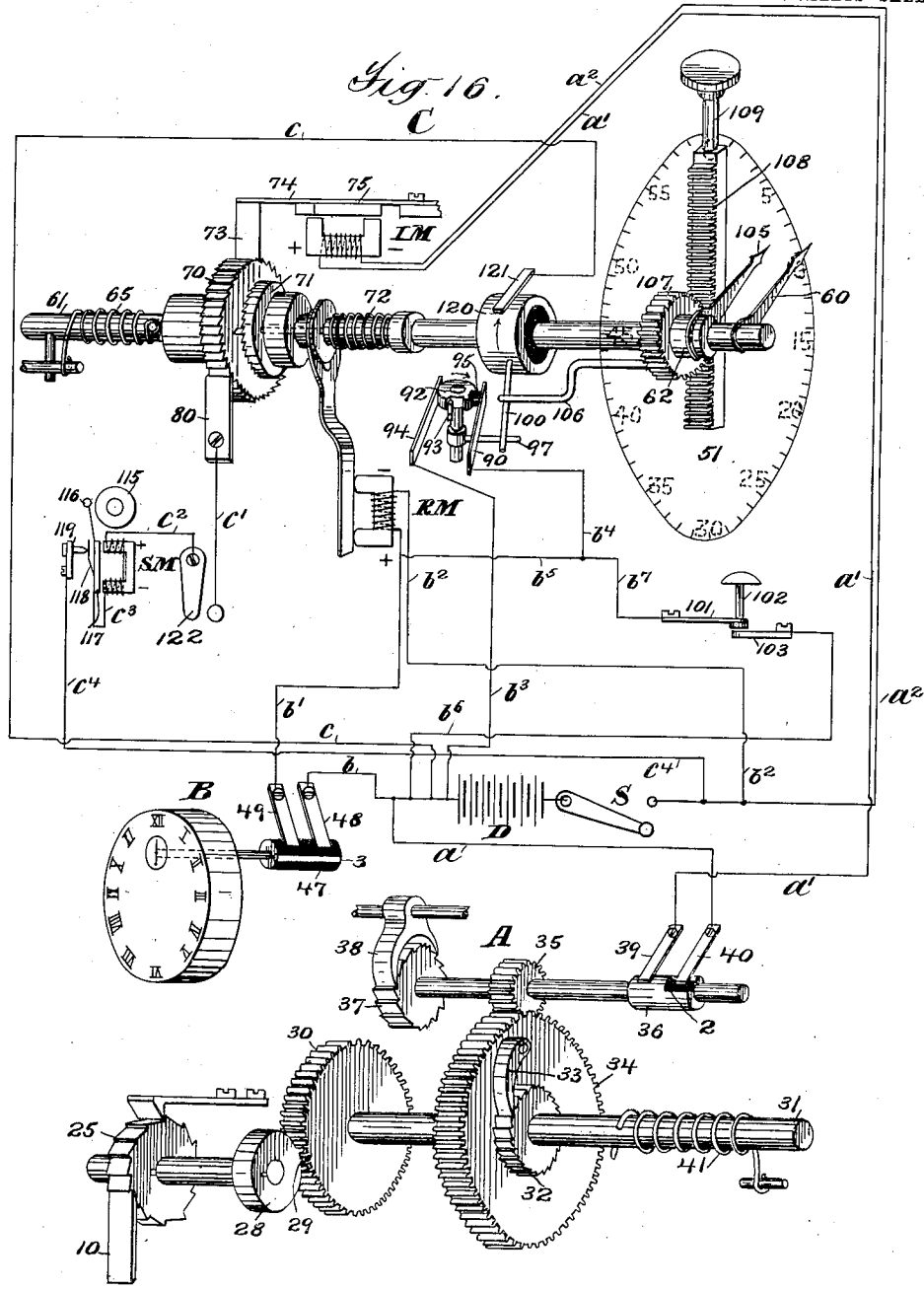

UNITED STATES PATENT OFFICE.

WESLEY TRAFFORD, OF NEW YORK, N. Y.

SPEED-INDICATOR.

961,559.

Specification of Letters Patent.   Patented June 14, 1910.

Application filed April 8, 1904.   Serial No. 202,150.

*To all whom it may concern:*

Be it known that I, WESLEY TRAFFORD, a citizen of the United States, residing at New York city, county of New York, and State of New York, have invented certain new and useful Improvements in Speed-Indicators, fully described and represented in the following specification and the accompanying drawings, forming a part of the same.

This invention relates to speed indicators for vehicles and aims especially to provide a speed indicator adapted for use on motor vehicles which shall be positive and accurate in its action, and shall have various features of convenience and utility, all as will hereinafter fully appear. To these ends I provide a distance indicator and means for automatically setting the indicator at the end of successive periods of time.

The distance indicating mechanism is preferably arranged to indicate miles for certain fractions of miles traveled by the vehicles, and the resetting mechanism is timed to set the indicating device at the end of successive fractional parts of an hour corresponding to the fractional part of a mile for which a mile is indicated. I find it convenient to cause the re-setting mechanism to operate at intervals of one minute, and in this case the distance indicator would be arranged to indicate a mile for every sixtieth part of a mile traveled, so that the number shown by the indicator at the end of each minute of travel will indicate the number of miles which the vehicle traveling at the same rate of speed would travel in one hour, that is, such number would indicate the rate of travel of the vehicle during the preceding minute in terms of miles per hour.

The indicating mechanism preferably includes an indicating device, such as a pointer, carried by a shaft, which is intermittently rotated by means of an electromagnet in a circuit which includes a circuit opening and closing device operated intermittently to close the circuit for every certain fractional part of a mile traveled by the vehicle. Such circuit closing device is preferably operated by the rotation of one of the vehicle wheels.

The means for operating the indicator hand, or other indicating device, preferably includes a clutch through which the indicating device is moved against the tension of a spring so that whenever the clutch is released the indicating device will be returned by the spring to zero or starting point. A second electromagnet is arranged to effect such release of the indicating device and is arranged in a circuit which includes a time switch adapted to close the circuit at certain intervals of time, preferably at intervals of one minute. Means are preferably provided whereby an alarm will be sounded or a signal shown if the speed of the vehicle equals or exceeds a certain desired speed, such signaling device being adapted to be set to cause the signal to be made at any desired speed. For this purpose there is preferably provided a contact device arranged to have a movement corresponding to the movement of the distance indicating device, and a second contact device which may be set at points corresponding to different positions of the distance indicating device, so that when the distance indicating device has been moved to indicate the speed at which the alarm is to be made the contact device moving therewith will make contact with the adjustable contact device and thereby close the circuit to an electromagnet by the movement of the armature of which the signal will be made. In addition to the means for re-setting the indicating device automatically at the end of successive periods of time, there is preferably provided means whereby the indicating device may be set back at will, such means consisting preferably of a switch or contact device for closing the circuit to the releasing magnet at will.

In addition to the features above generally referred to, the invention includes other features all of which will be hereinafter described and specifically pointed out in the claims.

A full understanding of the invention can best be given by a detailed description of a preferred construction embodying all the features thereof, and such a description will now be given in connection with the accompanying drawings.

Figure 3:
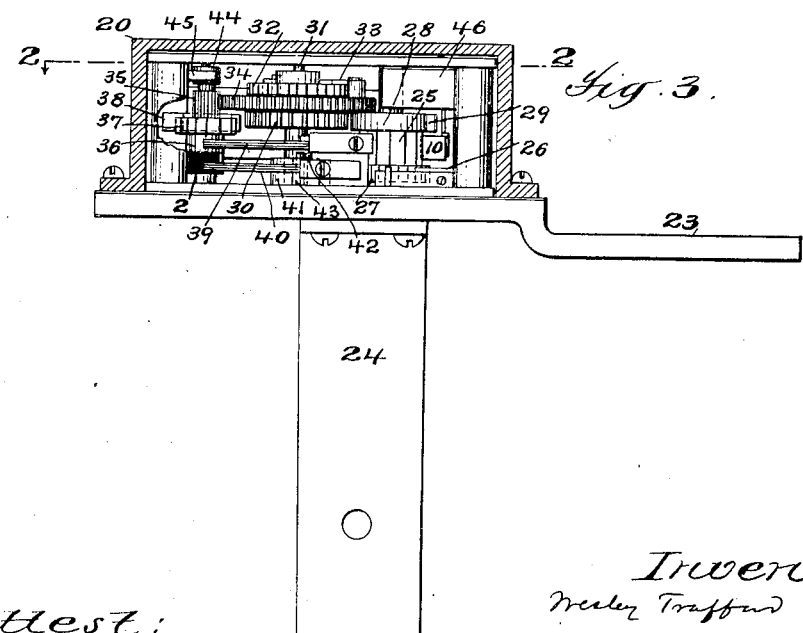

In said drawings, Figure 1 shows a portion of a motor vehicle provided with speed indicating apparatus constructed in accordance with the invention. Fig. 2 is a sectional plan view on line 2 of Fig. 3 of a circuit closing mechanism which is operated by the rotation of a wheel of the vehicle. Fig. 3 is a section on line 3 of Fig. 2. Figs. 4, 5 and 6 are sections taken respectively on lines 4, 5 and 6 of Fig. 2. Fig. 7 is a view of the indicator mechanism looking in the direction of the arrow 7 of Fig. 8 and with the casing in section and the bell plate removed. Fig. 8 is a view looking in the direction of the arrow 8 of Fig. 7 and with the casing shown in section. Figs. 9, 10 and 11 are views looking in the direction of the arrows 9, 10 and 11 of Fig. 7 respectively with the casing removed. Fig. 12 is a section taken on line 12 of Fig. 7. Fig. 13 is a view looking in the direction of the arrow 8 of Fig. 7, but with parts removed. Fig. 14 is a view looking in the direction of the arrow 9 of Fig. 7 with parts removed. Fig. 15 is a view looking in the direction of the arrow 7 of Fig. 8, with parts removed and partly in section on line 15 of Fig. 12. Fig. 16 is a diagrammatic view showing the electrical circuits and connections. Fig. 17 shows a dial marked for indicating minutes per mile as well as miles per hour.

The apparatus as shown consists of a circuit closing device A, a time switch B, and the indicating mechanism proper C. The circuit closing device A is preferably made separate from the mechanism C for the reason that it is convenient to have the indicating mechanism located within convenient sight and reach of the driver or controller of the vehicle, while the circuit closing device is desirably placed close to the wheel, or the part moving with the wheel, by which it is actuated. The time switch might, of course, be located within the casing of the part C of the apparatus, but as it is desirable to have a clock within sight of the driver of the vehicle, the time switch is conveniently arranged to be operated by the clock conveniently located as shown.

The circuit closing mechanism (see Figs. 1 to 6) includes an operating pawl 10, spring pressed and carried by a pivoted arm 11, which is moved against a spring 12 by means of a sliding rod or shaft 13 which is reciprocated by means of a cam disk 14 mounted to rotate with a wheel 15 of the vehicle, as shown in Fig. 1, the rod 13 being provided with collars 16 between which the edge of the cam disk 14 extends. The cam disk 14 is formed so as to give the rod 13 an inward and outward reciprocation for each revolution of the wheel 15. The rod 13 is preferably rotatably as well as slidably mounted in a bearing 17 so as to reduce wear and friction, and is preferably provided with a spring cushioned inner end, as shown in Fig. 2, to relieve excessive strain on the arm 11 as the rod moves inward. The operating parts of the circuit closing mechanism are preferably inclosed by a weather proof casing 20, as shown, and a stud 21 carried by a spring 22 mounted on the casing is preferably provided for transmitting movement to the arm 11 from the rod 13. The casing 20 is carried by a bracket 23 adapted to be attached to a part of the vehicle which carries or moves with the axle or stud on which the wheel 15 is mounted so that the sliding shaft 13 will always be maintained in proper position with relation to the actuating cam disk 14.

The pawl 10 engages a ratchet wheel 25 and rotates the same one step at each inward movement of the rod 13 and arm 11, reverse movement of the ratchet wheel being prevented by a pawl 26 engaging a second ratchet wheel 27 carried by the ratchet wheel 25. In the diagrammatic view (Fig. 16) the second ratchet wheel 27 is not shown, but the pawl 26 is shown in this drawing for the sake of simplicity as engaging the ratchet wheel 25. Mounted to rotate with the ratchet wheel 25 is a disk or wheel 28 which has a small number of teeth 29, three as shown, which engage a gear 30 to rotate the same a short distance and then release it. The gear 30 is fast on a shaft 31 which also has fast thereon a ratchet wheel 32 which is engaged by a pawl 33 carried by a gear 34 which is loosely mounted on the shaft 31. The gear 34 meshes with a pinion 35 on the shaft of a rotary circuit closer or switch 36, said shaft also carrying a ratchet wheel 37 with which engages a two armed escapement pawl 38 formed to prevent rotation of the ratchet wheel in one direction and to control its rotation in the other direction to prevent over-movement. The circuit closer 36, as shown, consists of a barrel or cylinder of conducting material against which contact springs 39 and 40 bear, and a portion of the face of which is formed of insulating material 2 against which the contact spring 40 rests when the cylinder is in its normal position of rest. The insulating face 2 extends only part way around the cylinder so that when the latter is rotated the two contact springs will be placed in electrical connection until the insulating face again comes beneath the contact spring 40.

In operation, while the vehicle is traveling the ratchet wheel 25 will be moved one step for each revolution of the vehicle wheel 15, and when the ratchet wheel has been rotated to bring the teeth 29 of the mutilated gear 28 in engagement with the gear 30, the gear 30 and ratchet wheel 32 will be rotated against the tension of a spring 41 as the ratchet wheel 25 makes its step by step movement until the teeth 29 are carried clear of the gear 30, the ratchet 32 during such movement moving past the pawl 33 and not causing any movement of the gear 34. When the teeth 29 have been moved out of engagement with the gear 30, such gear and the ratchet wheel 32 will be given a reverse movement by the spring 41, such reverse movement being limited by means of an arm 42 engaging a stop 43. Such reverse movement will cause a corresponding movement of the gear 34 by reason of the engagement of the pawl 33 carried by such gear with the ratchet wheel 32, and the switch 36 will be thereby rotated. The parts are so timed that the amount of forward movement given to the gear 30 and the ratchet wheel 32 by the teeth 29 will be such that the return movement of the same will cause the gear 34 to move just enough to cause a complete rotation of the cylinder 36 so that after each movement it will stop in position to break the connection between the springs 39 and 40, the movement of the switch thus causing a short electrical connection between the springs followed by the breaking of said connection.

The shaft of the cylinder 36 is preferably provided with a collar 44 having a flat face against which a flat spring 45 bears when the cylinder is in its normal position of rest, this being for the purpose of holding the cylinder against accidental displacement and for insuring its coming to rest in its proper position. A spring 46 is also preferably provided to bear against the shaft which carries the ratchet wheel 25, this spring serving as a friction device or drag to prevent overthrow of the ratchet wheel.

It will be seen that by the construction above described, the circuit will be completed by means of the circuit closer or switch 36 only once for several revolutions of the vehicle wheel 15. The particular apparatus shown in the drawings is arranged so that the indicating device moves only once for each mile indicated and as the movements of the indicating device depend on the closing of the circuit by the switch 36 such switch should operate only once for each mile to be indicated. The apparatus is also arranged to cause the re-setting mechanism to operate at intervals of one minute, and as before pointed out, the distance indicator is therefore arranged to indicate a mile for every sixtieth part of a mile traveled. The circuit closing device is therefore arranged and timed so that at each certain number of movements of the ratchet wheel 25 corresponding to one-sixtieth of a mile traveled, the gears leading to the switch 36 will be actuated to cause said switch to rotate and momentarily close the circuit between the contact springs 39 and 40.

The time switch or circuit closer may be of any suitable form arranged to close periodically the circuit including the electromagnet which controls the re-setting of the distance indicator. In the apparatus shown the time switch is arranged to close the circuit at intervals of one minute. A suitable form of time switch is shown in Fig. 16, consisting of a cylinder or barrel 47 against which contact springs 48 and 49 bear, the cylinder having the greater part of its surface of non-conducting material and having a strip of conducting material 3 extending longitudinally thereof and adapted to connect the contact springs for an instant at each rotation of the cylinder, the cylinder being driven by the clock work to make one rotation a minute.

Referring now to the mechanism marked C in Fig. 1 and shown in detail in Figs. 7 to 15, the various operating parts of such mechanism are mounted within a casing 50 having a dial face 51 protected by a glass 52. To avoid the transmission of jar from the vehicle to the casing 50 there is preferably provided a cushion support for the casing. A preferred form of cushion support is shown (see Figs. 7 and 8) in which the casing is provided with three lugs 53 having projections 53ª which extend into cushions of rubber or other suitable material 54 carried in hollow arms or standards 55 extending from a frame 56 carried by a bracket 57 of any suitable form adapted to be secured to the vehicle. The lugs 53 extend through openings in the hollow arms 55 which are of sufficient size to allow such movement of the lugs therein as is permitted by the cushions 54.

The distance indicating device proper in the construction shown comprises a pointer or indicating hand 60 adapted to move over the dial plate 51. The indicating hand 60 is mounted on a shaft 61 journaled centrally of the casing 50 in a sleeve 62 rotatably mounted in the face plate 63 and at the other end in a bracket 64. The shaft is under tension of a spring 65 which tends to rotate the shaft to return the indicating hand to the zero mark on the dial, such return movement of the shaft and the indicating hand being limited by means of a pin 66 carried by the shaft engaging a stop 67. In order to permit the shaft to make a full rotation against the tension of the spring, the pin 66 is carried by a disk 68 mounted on the shaft so as to permit of slight lost motion axially between the shaft and the disk (see Fig. 7).

The shaft 61 carries a ratchet wheel 70 mounted free to rotate thereon and normally locked thereto by means of a clutch disk 71 splined to slide on the shaft and held normally in engagement with the ratchet wheel 70 by means of a coiled spring 72. The ratchet wheel 70 is rotated to rotate the shaft 61 against the tension of the spring 65 by means of a pawl 73 pivoted on a lever 74 which carries the armature 75 of an electromagnet IM. The pawl 73 is pressed to duty by a spring 77 and the armature lever is held in its normal retracted position, as shown in the drawings, by a spring 78. Reverse movement of the ratchet wheel 70 is prevented by means of a stationary spring pawl 80, and over-movement of the ratchet wheel is prevented by a finger 81 carried by the armature lever 74 in position to engage the ratchet wheel on the actuating stroke of the armature. The magnet IM is in a circuit including the switch 36 of the circuit closing device A, and such circuit when the apparatus is in operation is closed except at the switch 36, so that at each closing of the circuit by the switch 36 the magnet will be energized and the indicating hand 60 moved one step over the dial 51. The dial 51 is marked with a scale indicating miles, and the indicating hand is moved at each movement of the armature lever 74 a distance corresponding to the distance which marks a mile on the dial.

To prevent accidental movement of the armature lever 74 by reason of jolting or vibration of the vehicle, a locking device is preferably provided for holding the armature lever in its retracted position and for releasing it for its movement by the magnet. A preferred form of locking device is shown in the drawings (see Figs. 7, 8 and 15) in which 82 represents a small armature carried by a lever 83 which lever also carries a locking arm 84 having a hooked end adapted to lie in front of the armature 75 when the armature lever 74 and the lever 83 are in their retracted positions, as shown in Fig. 15. The lever 83 is normally held in its retracted position by means of a spring 85. When the magnet IM is energized, the armature 82 is attracted and moves the lever 83 to carry the end of the locking arm 84 clear of the armature 75, thereby releasing the same and permitting the armature lever 74 to make its forward movement. When the magnet is again deënergized these parts return to the position shown in Fig. 15, the end of the locking arms snapping back into locking position when the armature lever 74 has returned to its normal position as shown.

For effecting the return of the indicating hand to zero position at certain intervals, at the end of each minute with the apparatus shown, a releasing mechanism is provided for moving the clutch disk 71 away from the ratchet wheel 70. Said mechanism as shown (see Figs. 12 and 13) comprises a releasing lever 86 pivoted at 87, one end of which lever is forked to extend into an annular groove in the hub of the clutch disk 71, and the other end of which lever carries an armature 88 in position to be attracted by the poles of an electromagnet RM. When the magnet is energized, the lever 86 is moved against the pressure of a spring 89 to carry the clutch disk 71 away from the ratchet wheel 70, thereby disconnecting the shaft from the ratchet wheel and allowing the shaft to rotate under the influence of its spring 65 to return the indicating hand 60 to zero position from any position to which it may have been moved. The magnet RM is in a circuit including the time switch, and when the circuit is closed by the time switch the magnet is energized and causes the re-setting of the indicating device.

Means are preferably provided for automatically returning the indicating hand to zero position in case it should be actuated to make a complete revolution before the re-setting magnet is energized by the time switch. For this purpose an automatically operated circuit closing device is provided located in a shunt to the portion of the circuit to the magnet RM including the time switch. Such circuit closing device as shown (see Figs. 7, 15 and 16) comprises a spring contact arm 90 mounted on a block 91 of insulating material and having a projecting end adapted to engage a contact disk 92 mounted on the block 91 and capable of a limited oscillating movement the extent of which is determined by a pin 93. Said disk is constantly engaged by a contact spring 94 and when in the position shown in Fig. 15 the contact arm 90 is held out of engagement with the disk by means of a cam projection 95 of insulating material carried by the disk, said cam projection preferably engaging an antifriction roll 96 mounted on the arm 90. When the disk is moved in the direction of the arrow in Fig. 15 from the position shown in said figure, the cam projection 95 is moved away from the antifriction roll 96 and the spring contact arm 90 is thereby allowed to move to bring its projecting end into contact with the disk. For so moving the disk 92, it is provided with an arm 97 projecting into the path of an arm 100 carried by the shaft 61, by which arm, as the shaft completes a rotation, the arm 97 will be engaged and moved to oscillate the disk 92 in the direction of the arrow in Fig. 15, and thereby make connection between the arm 90 and the disk and complete a circuit to the magnet RM and effect the release of the shaft 61 and permit it to be rotated by the spring 65 to return the indicating hand to zero position. As the shaft completes such return movement, the arm 100 will again engage the arm 97 and move it and the disk 92 in the opposite direction to again break the circuit between the contact arm 90 and the disk. To prevent the making of an electrical connection between the arm 100 and the disk 92 when the arm 100 engages the arm 97, the disk is insulated from the arm 97, as by being insulated as shown in Fig. 15 from the shaft or stud on which it is mounted and from which the arm 97 projects. It is also desirable to provide means for returning the indicator hand to zero position at will, and for this purpose a hand operated switch is provided also in shunt with the time switch. A simple form of switch or circuit closer for this purpose is shown (see Figs. 7 and 16), consisting of a contact spring 101 carrying a knob 102 projecting outside the casing 50 and adapted to make contact with a contact plate 103 when the knob is pressed inward.

The sleeve 62 carries a second indicating hand 105 which is thus movable independently of the indicating hand 60, and the sleeve 62 is also provided inside the casing with an arm or finger 106 in position to be engaged by the arm 100 when the two indicating hands 60 and 105 are together. When the two indicating hands are together therefore and the shaft 61 is rotated to advance the hand 60 about the dial the hand 105 will be caused to move with the hand 60, and when the shaft and hand 60 make their return movement the hand 105 will remain in the position to which it has been moved on the forward movement of the hand 60. If the two hands are not together at the zero position, the hand 105 will remain stationary as the hand 60 travels forwardly over the dial until the hand 60 reaches the hand 105, whereupon the two hands will move together during any further forward movement of the hand 60. The hand 105, therefore, if not reset will indicate the highest average speed at which the vehicle has run for any one minute, and if the hand 105 is set back at any time to a point on the scale corresponding to a speed less than the speed at which the vehicle is running, it will after the next return movement of the hand 60 show the speed at which the vehicle has run during the previous minute.

For re-setting the hand 105, the sleeve 62 is provided with a toothed portion or pinion 107 which is engaged by a sliding rack 108 from which a rod 109 projects outside the casing 50 and is provided with a knob, whereby the rack may be moved to set the hand 105 in any desired position (see Figs. 7, 12, 13 and 14). The hand may evidently be set so far around as to be entirely out of operation if desired. A spring 110 is preferably provided, as shown in Fig. 15, for bearing against the sliding rack 108 to hold it in any position to which it has been set until it is again moved either by hand or by the rotation of the shaft 61.

The parts just described also serve as means for setting and operating the signaling device by which a signal is made when the machine is running at or beyond a certain speed at which it is desired that the signal should be made. For this purpose the arms 106 and 100 form a circuit closing device for closing a circuit including an electromagnet SM which operates a suitable signaling device. The signaling device shown is a bell formed by a disk 115 which is hit by a knocker 116 on an arm carried by an armature lever 117, the armature lever carrying a contact spring 118 which engages a contact 119 as usual to secure the desired vibration of the armature lever when circuit to the magnet is closed.

To enable the arms 100 and 106 to serve as circuit closing members, the arm 100 is carried by a sleeve 120 fast on but insulated from the shaft 61, and an electrical connection is made to said sleeve 120 by means of a contact spring 121 bearing thereagainst. The arm 106 and sleeve 62 are in electrical connection with the shaft 61 to which electrical connection may be made through the supporting frame or in any suitable manner. The circuit to the signal magnet SM also includes a switch 122 having an operating knob 123 outside the casing 50 by which the signaling device may be put into or out of operation as desired. When it is desired to make use of the signaling device, the indicating hand 105 is set to the point of the dial indicating the speed at which it is desired the signal shall be made, and the switch 122 is turned to close the circuit. The signal circuit will then be broken only by the separation of the arms 100 and 106. If the indicating hand 60 reaches the indicating hand 105 before the circuit to the releasing magnet RM is closed to cause the return movement of the hand 60 and shaft 61, the circuit to the magnet SM will be closed by the arm 100 engaging the arm 106 and the bell will be sounded. The bell will then continue to operate until the circuit to the releasing magnet RM is closed either by operation of the time switch or by the pressure on the knob 102, or until the operating rod 109 is drawn outward to carry the arm 106 out of contact with the arm 100.

In order that the engagement of the arm 100 with the arm 106 shall not prevent the shaft 61 from making complete forward and return rotations, the arm 100 is mounted on the sleeve 120 so as to have a limited axial or circumferential movement thereon. For this purpose the arm is, as shown, (see Figs. 12 and 13) carried by a ring 125 held against the sleeve 120 by means of a ring or plate 126, the movement of the arm being limited as by means of shoulders on a plate 127 secured to the sleeve 120. The plate 126 should preferably be adjusted to bear against the ring 125 so as to offer sufficient frictional resistance to the axial movement of the ring to cause the arm 100 on the return rotation of the shaft 61 to move the arm 97 to shift the contact disk 92 without being itself shifted on the shaft 61, but not sufficient to overcome the resistance of the arm 106 and sleeve 62.

The operation of the apparatus, as a whole, will now be described, reference being had to the diagrammatic view, Fig. 16, showing the various electrical connections between the parts of the apparatus hereinbefore described and showing diagrammatically so much of the apparatus as is necessary to show the electrical connections and make the operation clear. This figure also shows a battery D and a master switch S which may be of any suitable form for putting the apparatus as a whole into or out of operation.

In the operation of the apparatus, at each rotation of the circuit closer 36, circuit will be completed from the battery D to the magnet IM as follows:—starting from the battery D by wire $a$ to contact spring 40, circuit closer 36, contact spring 39, wire $a'$, coil of magnet IM, wire $a^2$, and through switch S back to the battery D. The magnet being thus energized, its armature 75 will be attracted and the ratchet wheel 70 will be rotated one step, and the clutch disk 71 being in engagement with the ratchet wheel 70 the shaft 61 will be rotated and the indicating hand 60 will be moved one step. The closing of the circuit by the circuit closer 36 will be only momentary, and the magnet IM after being energized will be immediately deënergized again and its armature lever 74 and actuating pawl 73 will return to normal position. After the vehicle has traveled one-sixtieth of a mile, in the case of the particular arrangement of the apparatus shown, the circuit closing device 36 will be again actuated to close the circuit to the magnet IM and the indicating hand 60 will be moved another step.

The step by step movement of the hand 60 will continue until the circuit to the releasing magnet RM is closed. By the operation of the time switch, the circuit will be closed from battery D to the releasing magnet RM as follows:—starting from the battery D by wire $b$ to contact spring 48, contact 3 of the switch cylinder 47, contact spring 49, wire $b'$, the magnet RM, wire $b^2$, wire $a^2$ and switch S back to the battery. The magnet RM will thus be energized, and its armature being attracted the clutch disk 71 will be moved out of engagement with the ratchet wheel 70, thereby releasing the shaft 61 and allowing it to return under the influence of its spring 65 to carry the indicator hand 60 back to zero position. The closing of the circuit by the time switch is but momentary, and when connection between the contact springs 48 and 49 is again broken the magnet RM is deënergized and the clutch disk 71 returned to engagement with the ratchet wheel 70 for a repetition of the step by step forward movement of the indicator hand 60.

If the step by step movement of the shaft 61 and the indicator hand 60 continues to the extent of a complete revolution, the shifting of the contact disk 92 by engagement of the arm 100 with the arm 97 will close the circuit from the battery to the releasing magnet RM as follows:—starting from the battery D by wire $b^3$, to contact spring 94, contact disk 92, contact spring 90, wire $b^4$, wire $b^5$, and wire $b'$ to magnet RM and by wire $b^2$ to wire $a^2$ and switch S back to the battery. The magnet will thereby be energized to shift the clutch disk 71 and release the shaft 61 as before, and as the shaft 61 completes its return movement the arm 100 engaging the arm 97 will throw the disk 92 back to the position to break contact between the disk 92 and the contact spring 90, thereby again opening the circuit to the magnet RM.

By means of the hand switch 101 the circuit may be completed to the releasing magnet RM as follows:—starting from the battery D by wire $b^6$, contact 103, switch 101, wire $b^7$, wire $b^5$, wire $b'$ to the magnet RM, and thence returning to the battery D, as before.

When the signal switch 122 is turned to throw the signaling device in operation, the circuit to the signal magnet SM will be closed when the arm 100 engages the arm 106, which will be at the time the indicator hand 60 reaches the position to which the indicator hand 105 has been set, as follows:— starting from the battery D, by wire $c$, to contact spring 121, sleeve 120, arm 100, arm 106, sleeve 62, shaft 61, ratchet wheel 70, pawl 80, wire $c'$, switch 122, wire $c^2$, magnet SM, wire $c^3$, contact spring 118, contact 119, wire $c^4$, wire $a^2$ and switch S back to the battery. If desired the dial may be marked with a second series of figures to cause the indicating hands, in addition to indicating the speed in terms of miles per hour, to show also the speed in terms of minutes per mile, that is: the time required for traveling one mile. A dial so marked is shown in Fig. 17, where the outer series of figures indicates the number of minutes per mile corresponding to the miles per hour shown by the inner series of figures.

It will be understood that the invention is not to be limited to the exact construction and arrangement of parts and electrical connections shown for the purpose of illustrating the invention and to which the foregoing description has been mainly confined, but that it includes various changes and modifications thereof within the claims. It will be understood also, that parts and features of the invention may be employed independently of other parts and features thereof or with other co-acting parts as may be found feasible and desirable.

What is claimed is:—

1. In a speed indicator for vehicles, the combination of an indicating device, means for actuating the indicating device to indicate a mile for each certain fractional part of a mile traveled, means for re-setting the indicating device at the end of a corresponding fractional part of an hour, whereby the indicating device is caused to indicate the average speed of the vehicle during such fractional part of an hour in terms of miles per hour, and means for indicating after the re-setting of the indicating device the speed at which the vehicle traveled during such fractional part of an hour, substantially as described.

2. In a speed indicator for vehicles, the combination of an indicating device, means for actuating the indicating device to indicate a mile for each certain fractional part of a mile traveled, and means for re-setting the indicating device at the end of successive corresponding fractional parts of an hour, whereby the indicating device is caused to indicate the average speed of the vehicle during each such successive fractional part of an hour in terms of miles per hour, and means for indicating after the re-setting of the indicating device the speed at which the vehicle traveled during the preceding fractional part of an hour, substantially as described.

3. In a speed indicator for vehicles, the combination of an indicating device, means for actuating the indicating device to indicate a mile for each certain fractional part of a mile traveled, and means for re-setting the indicating device at the end of successive corresponding fractional parts of an hour, whereby the indicating device is caused to indicate the average speed of the vehicle during each such successive fractional part of an hour in terms of miles per hour, and an indicator for indicating the highest speed indicated by said indicating device, substantially as described.

4. In a speed indicator for vehicles, the combination of an indicating device, means for actuating the indicating device to indicate a mile for each certain fractional part of a mile traveled, and means for re-setting the indicating device at the end of successive corresponding fractional parts of an hour, whereby the indicating device is caused to indicate the average speed of the vehicle during each such successive fractional part of an hour in terms of miles per hour, and an indicator for indicating the highest speed indicated by said indicating device, and means for re-setting said indicator at will, substantially as described.

5. In a speed indicator for vehicles, the combination of an indicating device, means for actuating the indicating device to indicate a mile for each certain fractional part of a mile traveled, and means for re-setting the indicating device at the end of successive corresponding fractional parts of an hour, whereby the indicating device is caused to indicate the average speed of the vehicle during each such successive fractional part of an hour in terms of miles per hour, and an indicator adapted to be moved by the indicating device during the forward movement of the latter, substantially as described.

6. In a speed indicator for vehicles, the combination of an indicating device, means for actuating the indicating device to indicate a mile for each certain fractional part of a mile traveled, and means for re-setting the indicating device at the end of successive corresponding fractional parts of an hour, whereby the indicating device is caused to indicate the average speed of the vehicle during each such successive fractional part of an hour in terms of miles per hour, and an indicator adapted to be moved by the indicating device during the forward movement of the latter, and means for re-setting said indicator at will, substantially as described.

7. In a speed indicator for vehicles, the combination of an indicating device, means for actuating the indicating device to indicate a mile for each certain fractional part of a mile traveled, and means for re-setting the indicating device at the end of successive corresponding fractional parts of an hour, whereby the indicating device is caused to indicate the average speed of the vehicle during each such successive fractional part of an hour in terms of miles per hour, and means for re-setting the indicating device at will, substantially as described.

8. In a speed indicator for vehicles, the combination of an indicating device, means for actuating the indicating device to indicate a mile for each certain fractional part of a mile traveled, and means for re-setting the indicating device at the end of successive corresponding fractional parts of an hour, whereby the indicating device is caused to indicate the average speed of the vehicle during each such successive fractional part of an hour in terms of miles per hour, and a signal device, means controlled by the movement of the indicating device to operate the signal device when the indicating device has been moved to indicate a certain speed, and means for setting said operating means for any desired speed, substantially as described.

9. In a speed indicator for vehicles, the combination of an indicating device, operating means therefor including an electromagnet, a circuit-closer located in the circuit of said magnet, means for actuating the circuit-closer controlled by the rotation of one of the vehicle wheels, means for re-setting the indicating device, an electromagnet for actuating the re-setting means, a time switch for closing the circuit to said magnet at the end of successive intervals of time, and means for closing circuit to said magnet at will, substantially as described.

10. In a speed indicator for vehicles, the combination of an indicating device, operating means therefor including an electro-magnet, a circuit-closer located in the circuit to said magnet, means for actuating the circuit-closer controlled by the rotation of one of the vehicle wheels, means for re-setting the indicating device, an electro-magnet for actuating the re-setting means, a time switch for closing the circuit to said magnet at the end of successive intervals of time, and means for automatically closing circuit to said magnet when the indicating device has made a certain movement, substantially as described.

11. In a speed indicator for vehicles, the combination of an indicating device, operating means therefor including an electro-magnet, a circuit-closer located in the circuit to said magnet, means for actuating the circuit-closer controlled by the rotation of one of the vehicle wheels, means for re-setting the indicating device at the end of a certain interval of time, and means for indicating after the re-setting of the indicating device the speed at which the vehicle traveled during such interval of time, substantially as described.

12. In a speed indicator for vehicles, the combination of an indicating device, operating means therefor including an electro-magnet, a circuit-closer located in the circuit to said magnet, means for actuating the circuit-closer controlled by the rotation of one of the vehicle wheels, means for re-setting the indicating device at the end of successive intervals of time, and an indicator adapted to be moved by the indicating device during the forward movement of the latter, substantially as described.

13. In a speed indicator for vehicles, the combination of an indicating device, operating means therefor including an electro-magnet, a circuit-closer located in the circuit of said magnet, means for actuating the circuit-closer controlled by the rotation of one of the vehicle wheels, a secondary armature for said electro-magnet, and means controlled by the movement of the secondary armature for holding the main armature of the magnet against accidental movement and for releasing it when the magnet is energized, substantially as described.

14. The combination with an electro-magnet and its armature, of a secondary armature for said electro-magnet and means controlled by the movement of the secondary armature for holding the main armature against accidental movement and for releasing it when the magnet is energized, substantially as described.

15. In a speed or distance indicator for vehicles, the combination of an indicating device, operating means therefor including an electro-magnet, a circuit-closer located in the circuit to said magnet, a member adapted to be reciprocated by a concentric cam mounted to rotate with one of the vehicle wheels, and means controlled by the movement of said member for operating the circuit-closer, substantially as described.

16. In a speed or distance indicator for vehicles, the combination of an indicating device, operating means therefor including an electro-magnet, a circuit-closer located in the circuit to said magnet, a member adapted to be reciprocated by a concentric cam mounted to rotate with one of the vehicle wheels, and means controlled by the movement of said member for operating the circuit-closer intermittently once for a plurality of reciprocations of said member, substantially as described.

17. In a speed or distance indicator for vehicles, the combination of an indicating device, a member adapted to be reciprocated by a concentric cam mounted to rotate with one of the vehicle wheels, and means controlled by the movement of said member for operating the indicating device, substantially as described.

18. In a speed or distance indicator for vehicles, the combination of an indicating device, operating means therefor including an electro-magnet, a circuit-closer located in the circuit to said magnet, and mechanism controlled by the rotation of one of the vehicle wheels for operating the circuit-closer intermittently, said mechanism including means for causing a complete circuit closing and opening movement of the circuit-closer and for preventing its coming to rest when it has made only a partial movement, substantially as described.

19. The combination with an indicator or the like, of supporting means therefor comprising a support, a plurality of tubular arms carried by the support, cushions of india rubber or similar material in said arms, and a plurality of lugs extending from the indicator casing through openings in said arms and supported by said cushions, said openings being larger than the lugs to permit movement of the lugs therein, substantially as described.

20. The combination with an indicator or the like, of supporting means therefor comprising a support, a plurality of pairs of cushions of india rubber or similar material carried by the support, and a plurality of lugs extending from the indicator casing, each of said lugs extending between a pair of cushions and having oppositely extending projections to enter openings in the cushions, substantially as described.

In testimony whereof, I have hereunto set my hand, in the presence of two subscribing witnesses.

WESLEY TRAFFORD.

Witnesses:
A. L. KENT,
T. F. KEHOE.